United States Patent
Nichols et al.

(10) Patent No.: US 10,133,622 B2
(45) Date of Patent: Nov. 20, 2018

(54) ENHANCED ERROR DETECTION IN DATA SYNCHRONIZATION OPERATIONS

(71) Applicant: Microsoft Technology Licensing, LLC, Redmond, WA (US)

(72) Inventors: Jack Allen Nichols, Mill Creek, WA (US); Ryan Gordon Zacher, Woodinville, WA (US); György Keresztély Schadt, Redmond, WA (US); Rayyan Jaber, Seattle, WA (US); Erik Hampton Soderberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 14/551,415

(22) Filed: Nov. 24, 2014

(65) Prior Publication Data

US 2016/0147622 A1    May 26, 2016

(51) Int. Cl.
| | |
|---|---|
| *G06F 17/30* | (2006.01) |
| *G06F 11/07* | (2006.01) |
| *G06F 11/36* | (2006.01) |
| *G06F 11/32* | (2006.01) |
| *G06F 17/40* | (2006.01) |

(52) U.S. Cl.
CPC ...... *G06F 11/0793* (2013.01); *G06F 11/3632* (2013.01); *G06F 17/30144* (2013.01); *G06F 17/30174* (2013.01); *G06F 11/327* (2013.01); *G06F 17/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,144,967 A | * | 11/2000 | Nock | G06F 11/3476 |
| 7,895,167 B2 | | 2/2011 | Berg et al. | |
| 8,037,476 B1 | * | 10/2011 | Shavit | G06F 9/526 |
| | | | | 711/150 |
| 2003/0208500 A1 | * | 11/2003 | Daynes | G06F 17/30607 |

(Continued)

OTHER PUBLICATIONS

"Is there a log file analyzer for log4j files?", Published on: Jun. 6, 2010, Available at: http://stackoverflow.com/questions/2590251/is-there-a-log-file-analyzer-for-log4j-files.

(Continued)

*Primary Examiner* — Farhan Syed

(57) ABSTRACT

Disclosed herein are systems, methods, and software for enhancing error detection in data synchronization operations. In an implementation, log data reported by a device is received and incorporated into an event database indicating interleaved events related to data synchronization threads on the device. The event database is queried to extract a listing of events in the event database, the listing of events comprising events potentially associated with at least one error condition in the data synchronization threads. The listing of events is processed to identify one or more patterns from among the interleaved events that indicate the at least one error condition in the data synchronization threads. Responsive to identifying the one or more patterns, an indication of the at least one error condition in the data synchronization threads is communicated.

20 Claims, 10 Drawing Sheets

(56) References Cited

U.S. PATENT DOCUMENTS

| | | | |
|---|---|---|---|
| 2004/0199828 A1* | 10/2004 | Cabezas | G06F 11/0748 |
| | | | 714/39 |
| 2008/0115141 A1* | 5/2008 | Welingkar | G06F 9/5011 |
| | | | 718/104 |
| 2008/0301135 A1 | 12/2008 | Alves et al. | |
| 2009/0119307 A1 | 5/2009 | Braun et al. | |
| 2009/0319996 A1* | 12/2009 | Shafi | G06F 8/314 |
| | | | 717/125 |
| 2012/0143893 A1 | 6/2012 | Abraham | |
| 2013/0198227 A1 | 8/2013 | Fradkin et al. | |
| 2014/0380282 A1* | 12/2014 | Ravindranath Sivalingam | |
| | | | G06F 11/3476 |
| | | | 717/128 |
| 2017/0132111 A1* | 5/2017 | Ravindranath Sivalingam | |
| | | | G06F 11/3476 |

OTHER PUBLICATIONS

Barringer, et al., "Formal Analysis of Log Files", In Journal of Aerospace Computing, Information, and Communication, vol. 7, Nov. 2010, 26 pages.

Rouillard, John P., "Real-time Log File Analysis Using the Simple Event Correlator (SEC)", In Proceedings of the 18th USENIX conference on System administration, Nov. 14, 2004, 18 pages.

Pei, et al., "Mining Access Patterns Efficiently from Web Logs", In Proceedings of the 4th Pacific-Asia Conference on Knowledge Discovery and Data Mining, Apr. 18, 2000, 12 pages.

\* cited by examiner

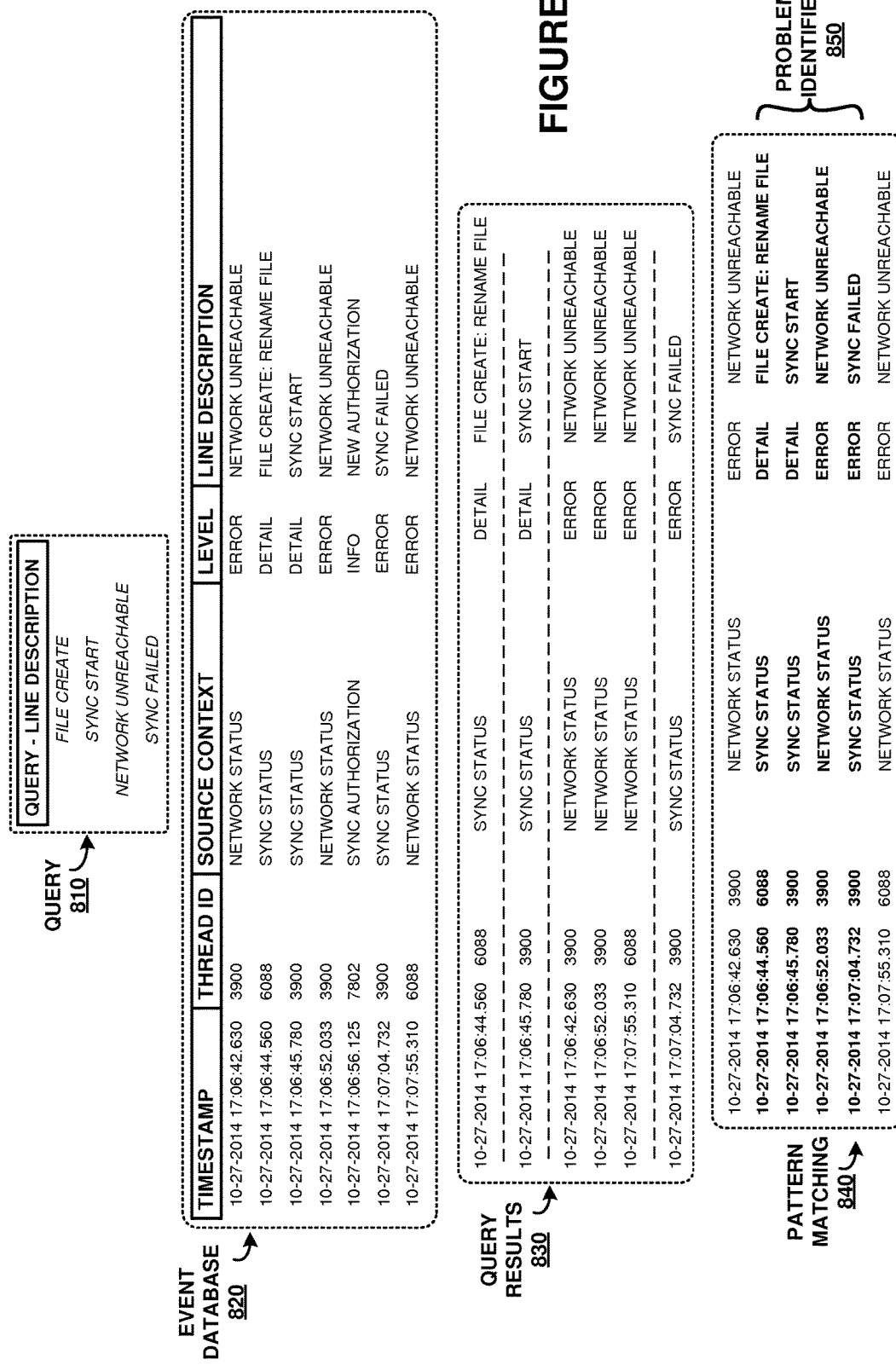

DATA SYNC PROBLEMS FOUND

900

RESULTS — 910

| CODE | DESCRIPTION |
|---|---|
| E2490358 | SYNC ERROR TYPE 1 |
| E4645353 | NETWORK ERROR TYPE 1 |
| E5187520 | LOG ERROR TYPE 1 |
| E9191482 | LOG ERROR TYPE 2 |
| E3585620 | NETWORK ERROR TYPE 2 |

CODE — 912: E2490358

ERROR — 913: SYNC ERROR TYPE 1

DESCRIPTION — 914: THIS IS A LIKELY PROBLEM WITH THE SYNCHRONIZATION PROCESS, THE NETWORK CONNECTION WAS LOST AND WHEN IT RETURNED, AUTHORIZATION FOR SYNCHRONIZATION WAS STILL NOT COMPLETED.

ERROR STATUS — 915:
- BUG
- RESOLUTION = FIXED IN LATEST REVISION OF SYNC ENGINE

FIGURE 9

ENHANCED ERROR DETECTION IN DATA SYNCHRONIZATION OPERATIONS

TECHNICAL BACKGROUND

Computer devices, such as personal computers, portable computing devices, and the like, store user data using various local storage media and storage devices. Cloud computing systems have been introduced which allow for portable, remote storage of user data by these computing devices. In many cases, the cloud computing systems allow for synchronization of user data across different devices. For example, user data created on a personal computer may be stored on a cloud storage system for synchronization with other computer devices, such as mobile phones, laptops, and other personal computers.

However, in many examples of user data synchronization between end user devices and cloud storage systems, or even between end user devices, these synchronization operations may encounter problems. The problems may be encountered due to network connectivity issues, software incompatibilities, authorization or authentication issues, or other problems. Although synchronization software tools can maintain logs for the various synchronization operations, isolating root causes of the synchronization problems is difficult and can lead to intensive technical support investigations.

OVERVIEW

Provided herein are systems, methods, and software for enhancing error detection in data synchronization operations. In an implementation, log data reported by a device is received and incorporated into an event database indicating interleaved events related to data synchronization threads on the device. The event database is queried to extract a listing of events in the event database, the listing of events comprising events potentially associated with at least one error condition in the data synchronization threads. The listing of events is processed to identify one or more patterns among the interleaved events that indicate at least one error condition in the data synchronization threads. Responsive to identifying one or more patterns, an indication of at least one error condition in the data synchronization threads is communicated.

Multi-threaded or multi-process operations can interleave or intersperse events from the various operations into log data. In the various implementations presented herein, problem detection indicated in this log data is improved, among other improvements in querying, reporting, and monitoring of data synchronization operations.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 8 is a diagram illustrating an example pattern match.
FIG. 9 is a diagram illustrating an example problem search result.

DETAILED DESCRIPTION

Cloud computing systems allow for portable, remote storage of user data by computing devices. Cloud computing systems include platform-based software systems for synchronization and storage of end user data. Examples of these cloud storage platforms include Microsoft OneDrive®, Google Drive®, Apple iCloud®, and Dropbox™, among others. In many cases, the cloud computing systems can allow for synchronization of user data across different devices. For example, user data created on a first user device can be stored on a cloud storage system for synchronization with other user devices, such as mobile phones, laptops, and other personal computers.

However, in many examples of user data synchronization between end user devices and cloud storage systems, or even between different end user devices, these synchronization operations can encounter problems. The problems can be encountered due to network connectivity issues, software incompatibilities, authorization or authentication issues, end user actions, or other problems. In the examples herein, logs comprising log data related to data synchronization operations are processed in an enhanced manner. This enhanced manner allows for increased speed and effectiveness in identifying synchronization problems and presenting indications of these problems to users or administrators.

In data synchronization operations, a sequence of events might indicate a problem in the data synchronization operations. Data synchronization operations can include multi-threaded operations, where operations associated with many different execution threads are included in a single merged log which interleaves events from the different threads in the log. These events can be interspersed throughout log data with other events unrelated to the problem.

However, finding these sequences in large sets of log data can be computationally intensive and difficult. For example, a sequence of events might include (1) start synchronization process, (2) scan for file changes, (3) find changes for file A, (4) find changes for file B, (5) start uploading file A to synchronize with cloud data, (6) detect network disconnection, (7) postpone upload for file B due to network disconnection, and (8) file A has an upload error. This sequence of events might be indicative of a problem for uploading file A to the cloud server, but only by examining the sequence of events leading up to the error indicated in event (8) can a problem be identified. A sequence might only include event (2), (3), (5), (6), and (8) for a particular problem related to synchronization of file A. However, events related to file B as well as other unrelated events might be interspersed or interleaved with the events related to file A. In the examples below, logs comprising log data related to data synchronization operations are processed in an enhanced manner.

Figure 1:
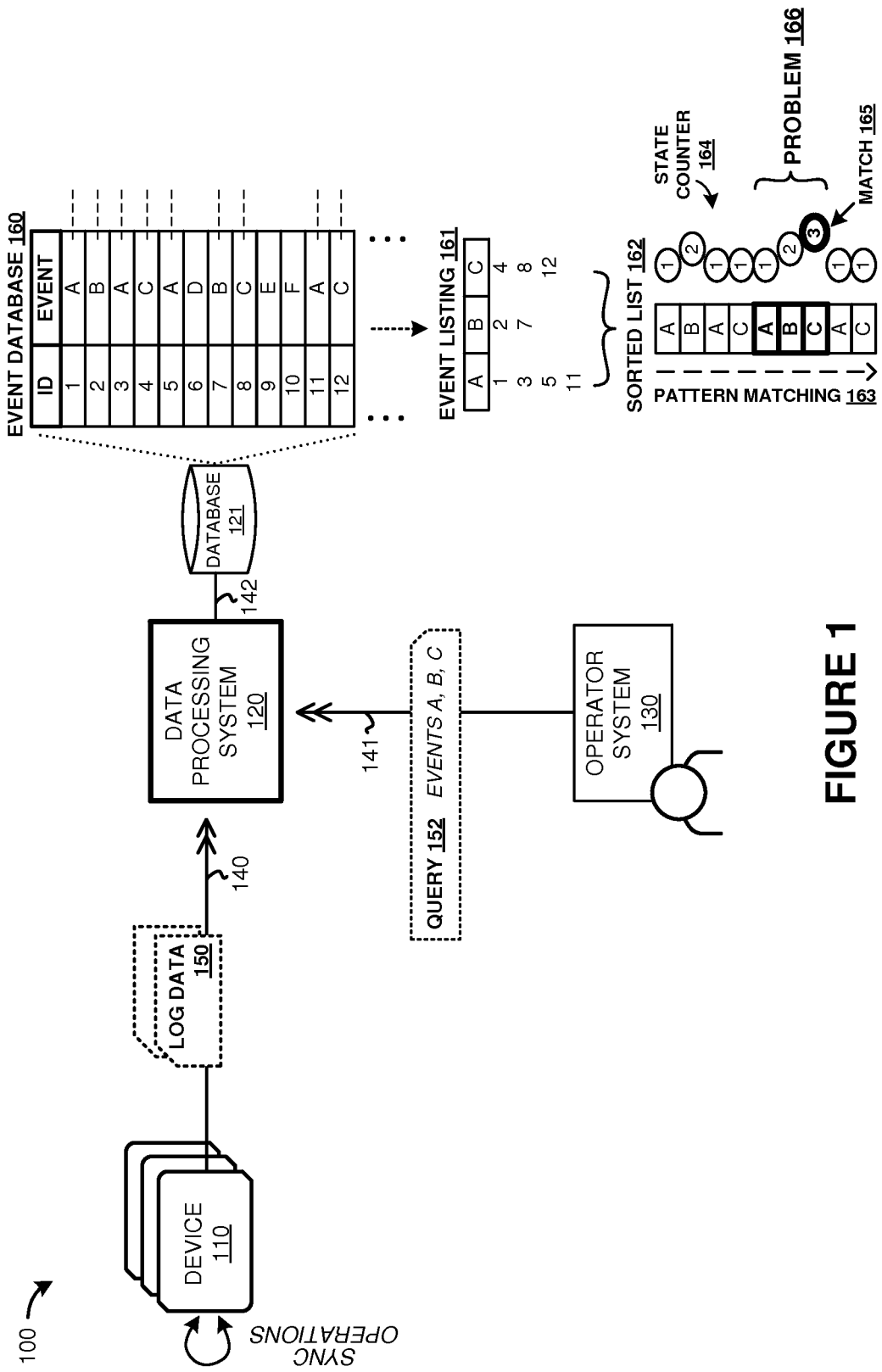
FIG. 1 is a system diagram illustrating a data synchronization architecture in an implementation.

As a first example, FIG. 1 is presented. FIG. 1 is a system diagram illustrating data synchronization architecture 100. Data synchronization architecture 100 includes one or more devices (represented by device 110), data processing system 120, and operator system 130. Device 110 and data processing system 120 communicate over data link 140. Operator system 130 and data processing system 120 communicate over data link 141. Database 121 is also include in FIG. 1, and can be included in elements of data processing system 120, or as a separate element which communicates with data processing system 120 over database link 142.

In operation, device 110 engages in data synchronization operations, which can include synchronizing data with a cloud storage system, not shown in FIG. 1 for clarity. Events related to these data synchronization operations can be maintained by device 110 in a data log, and this data log can be periodically transferred by device 110 over data link 140 for delivery to data processing system 120 or database 121. Although device 110 is discussed in FIG. 1, it should be understood that further user devices can also engage in similar data synchronization operations.

Figure 2:
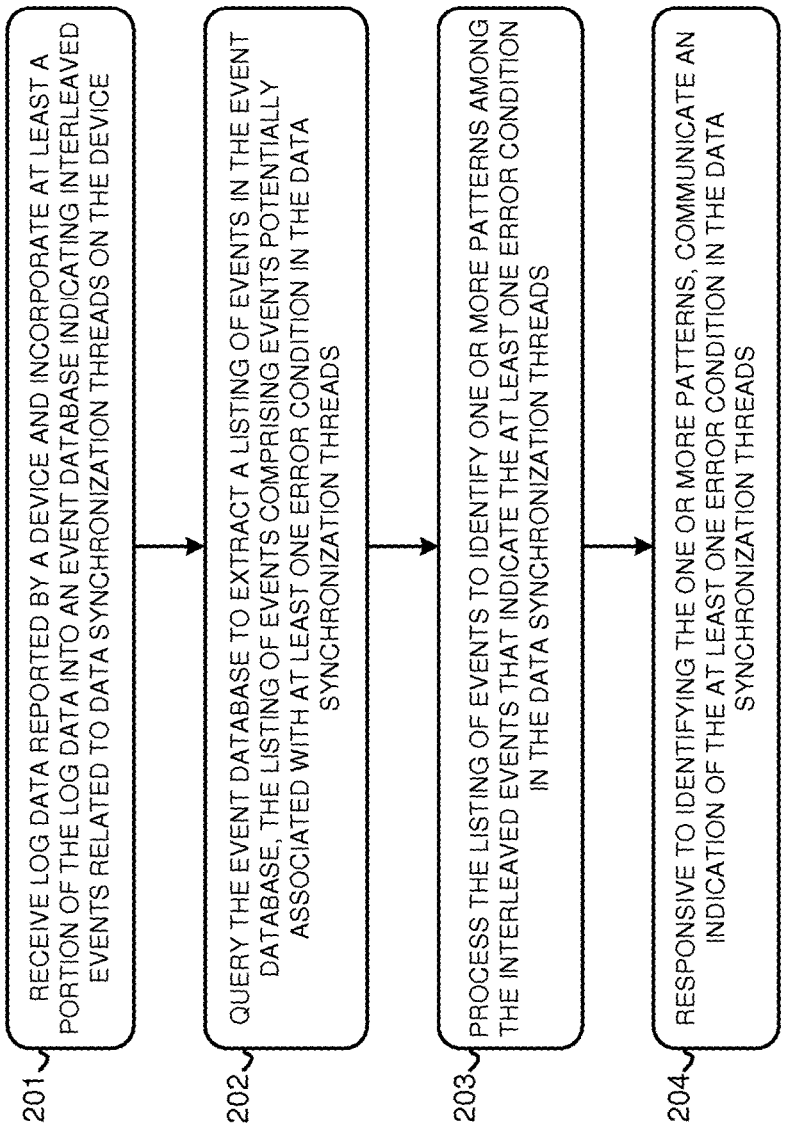
FIG. 2 is a flow diagram illustrating a method of enhancing error detection in data synchronization operations in an implementation.

FIG. 2 is presented to further illustrate the operations of FIG. 1. FIG. 2 is a flow diagram illustrating a method of operation of data processing system 120. The operations of FIG. 2 are referenced below parenthetically. In FIG. 2, data processing system 120 receives (201) log data reported by a device and incorporates at least a portion of the log data into an event database indicating interleaved events related to data synchronization operations on the device. As shown in FIG. 1, log data 150 is transferred by device 110 for delivery to data processing system 120. Responsive to receiving log data 150, data processing system 120 incorporates at least a portion of log data 150 into database 121.

Log data 150 includes a collection of events that indicate events related to data synchronization operations on device 110. These events can be organized into a list, a tabular arrangement, or other data structure configurations. In typical examples, the events represent the operations of software executed on device 110, such as a data sync engine or similar data transfer application. Other events can be included, such as status or statistical information related to the operation of device 110, such as network connectivity status, end user activity status, timestamps, metadata associated with the data or synchronization threads, among other events, including combinations thereof. Also, the events of several operations are interspersed or interleaved among log data 150. A snapshot of the state of data synchronization operations can be included in log data 150. Specifically, in a multi-threaded data synchronization application, events related to many different synchronization threads can be interleaved or merged together and included in log data 150.

Incorporation into database 121 can include taking only a parsed subset of the events of log data 150 and introducing the events into database 121. In other examples, all of the events of log data 150 are incorporated into database 121, such as by changing a data format of the events found in log data 150 into one suitable for database 121. In further examples, only a subset of events that satisfy certain criteria are introduced into database 121, such as date or time ranges, or events of a certain type, among other criteria.

Data processing system 120 queries (202) the event database to extract a listing of events in the event database, the listing of events comprising events potentially associated with at least one error condition in the data synchronization threads. In FIG. 1, event database 160 is shown as a representative example of a portion of an event database. Event database 160 can include various information related to the events, as detailed in further examples below, but this example includes an identifier (ID) and event name. Event database 160 also includes interleaved events. The interleaved events include events from one or more threads or operations of device 110. In many examples, interleaving events of multiple threads comprises a mixing of events together in order of occurrence as denoted by an associated timestamp or other identifier.

Data processing system 120 queries event database 160 using one or more queries to identify event listing 161. In this example, query 152 includes a query for events A, B, and C. Operator system 130 can issue this query over data link 141, and query 152 can be stored by data processing system 120 from a previously defined query. Event listing 161 includes a subset of the events of event database 160, where the subset of events corresponds to parameters specified in query 152. Event listing 161 includes only those events which are specified by query 152, namely A, B, and C events. However, query 152 extracts all instances of the specified events from event database 160, which in some examples is regardless of order or sequence in event database 160.

Data processing system 120 processes (203) the listing of events to identify one or more patterns among the interleaved events that indicate the at least one error condition in the data synchronization threads. Event listing 161 includes events extracted from event database 160 using at least query 152, with the events grouped in columns according to event type and having an associated ID indicated in each event group in listing 161. These events of event listing 161 are organized in FIG. 1 in a columnar format, with a corresponding ID for each event listed below the event type, namely a first column for event type A, a second column for event type B, and a third column for event type C. Instead of a columnar format, event listing 161 may employ a single table or other data structure, with each type of event organized into associated groups within the data structure.

Data processing system 120 arranges these events in order to create sorted list 162, using the ID as an ordering parameter in this example. In examples where a timestamp is used as the ID, the timestamp of each event can be used to arrange events in chronological order.

Query 152 can specify an order of occurrence for events A, B, and C, which can be indicative of a problem with the data synchronization operations. This sequential order might correspond to a specific problem, however, finding this order of events among the interleaved event database can be difficult and computationally intensive. In this example, a pattern matching process 163 is performed on sorted list 162 to find a specific pattern specified by query 152 that indicates a particular problem. For example a sequential order of the events specified by query 152 can indicate problem 166. Problem 166 can correspond to a specific problem with data synchronization operations.

In the specific example in FIG. 1, a sequence of A, B, C is specified as corresponding to a problem in data synchronization operations. However, many other events are interspersed or interleaved in event database 160, and the operations detailed above can quickly identify if the sequence is found in event database 160.

During pattern matching process 163, state counter 164 is employed to track if a match is found. As each event is encountered in sorted list 162, a state count is either incremented or reset according to the event encountered. For example, an initial value of 1 can be used for state counter 164, and if a 'B' event is encountered after an 'A' event then the counter can be incremented to 2. Likewise, if a 'C' event is encountered after a 'B' event, then the counter can be incremented to 3. If an event encountered does not match the sequence desired, then state counter is reset to 1. Sorted list 162 is walked through by pattern matching process 163 until all events in sorted list 162 are analyzed. If a match is found then a problem is indicated in sorted list 162. For example, in FIG. 1, when state counter 164 reaches a value of 3, then match 165 is found, and problem 166 is identified. Problem 166 can be identified in the data structure employed for sorted list 162, or can be kept track of in a separate data structure, such as a flag or alert value.

Patterns other than sequential occurrence can be employed to indicate problems in data synchronization operations, such as statistical patterns, probability patterns, gap detection, or other patterns. In gap detection examples, a particular sequence of events is found that lack a particular event or events. For example, if a sequence was desired that include A, not B, and C (i.e. A, !B, C) then a similar state counter can be employed which increments according to the parameters of the sequence, namely an 'A' event followed by no 'B' event, followed by a 'C' event. This type of sequence can be useful when wanting to only include sequences which a 'B' event is not interspersed between 'A' and 'C' events. In addition to the sequential examples noted above, other pattern matching algorithms for different pattern types can be employed, such as discussed below for statistical or probabilistic queries. Also, other matching queries can be employed, such as matching when greater than N number of events occur within M total number of events, or finding when a quantity of an event type exceeds a threshold number of events.

Responsive to identifying the one or more patterns, data processing system 120 communicates (204) an indication of the at least one error condition in the data synchronization threads. Problem 166 can correspond to a specific problem with data synchronization operations, such as network connectivity issues, authorization or authentication problems, end user activity issues, or other problems. Data processing system 120 communicates an indication of problem 166. Problem 166 can be communicated to operator system 130 or to device 110, among other destinations. A graphical user interface may be presented by data processing system 120 which indicates problem 166, or a data representation might be presented. In further examples, result templates are employed which correspond to a particular type of problem. When problem 166 corresponds to a particular result template, then a result message can be deployed which indicates problem 166, among other information, including proposed solutions, root cause indications, or instructions to a user, among combinations thereof.

Returning to the elements of FIG. 1, device 110 is representative of one or more end user computing devices, such as computers, laptops, servers, smartphones, tablet computers, gaming devices, media capture devices, personal digital assistant (PDA), e-book, mobile Internet appliance, media player, or other devices, including combinations thereof. Device 110 communicates over at least data link 140, which can include network interfaces, wireless interfaces, transceivers, network interface cards, or other links. Device 110 comprises network transceiver circuitry, processing circuitry, and user interface elements. The transceiver circuitry typically includes amplifiers, filters, modulators, and signal processing circuitry. Device 110 can also include user interface systems, network interface card equipment, memory devices, non-transitory computer-readable storage mediums, software, processing circuitry, or some other communication components.

Data links 140-142 can each include equipment and systems to route packet communications between endpoints using packet-based communication protocols, including Internet protocol (IP) and Ethernet. Data links 140-142 can comprise wired and wireless links, routers, switches, gateways, and bridges. Although a single link for each of data links 140-142 is shown in FIG. 1, it should be understood that other links could be included, such as the Internet, local area networks, wide area networks, wireless networks, cellular networks, optical networks, sonic networks, metropolitan area networks, among other networks and systems. In some examples, data links 140-141 can each comprise logical or software links. Data links 140-142 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

Data processing system 120 comprises computer processing systems and equipment to receive log data, store log data, and process log data, among other operations discussed herein. Data processing system 120 can include communication or network interfaces, graphical user interfaces, as well as computer systems, microprocessors, circuitry, cloud-based systems, or some other processing devices or software systems, and can be distributed among multiple processing devices. Examples of data processing system 120 can also include software such as an operating system, databases, utilities, drivers, networking software, and other software or data structures stored on one or more computer-readable media. In some examples, data processing system 120 includes elements discussed below in FIG. 9.

Operator system 130 comprises computer processing systems and equipment to generate queries, report problems to operators, and instruct data processing system 120, among other operations discussed herein. Operator system 130 can include communication or network interfaces, graphical user interfaces, as well as computer systems, microprocessors, circuitry, cloud-based systems, or some other processing devices or software systems, and can be distributed among multiple processing devices. Examples of operator system 130 can also include software such as an operating system, databases, utilities, drivers, networking software, and other software stored on a computer-readable medium. In some examples, operator system 130 and data processing system 120 are incorporated into the same elements.

Figure 3:
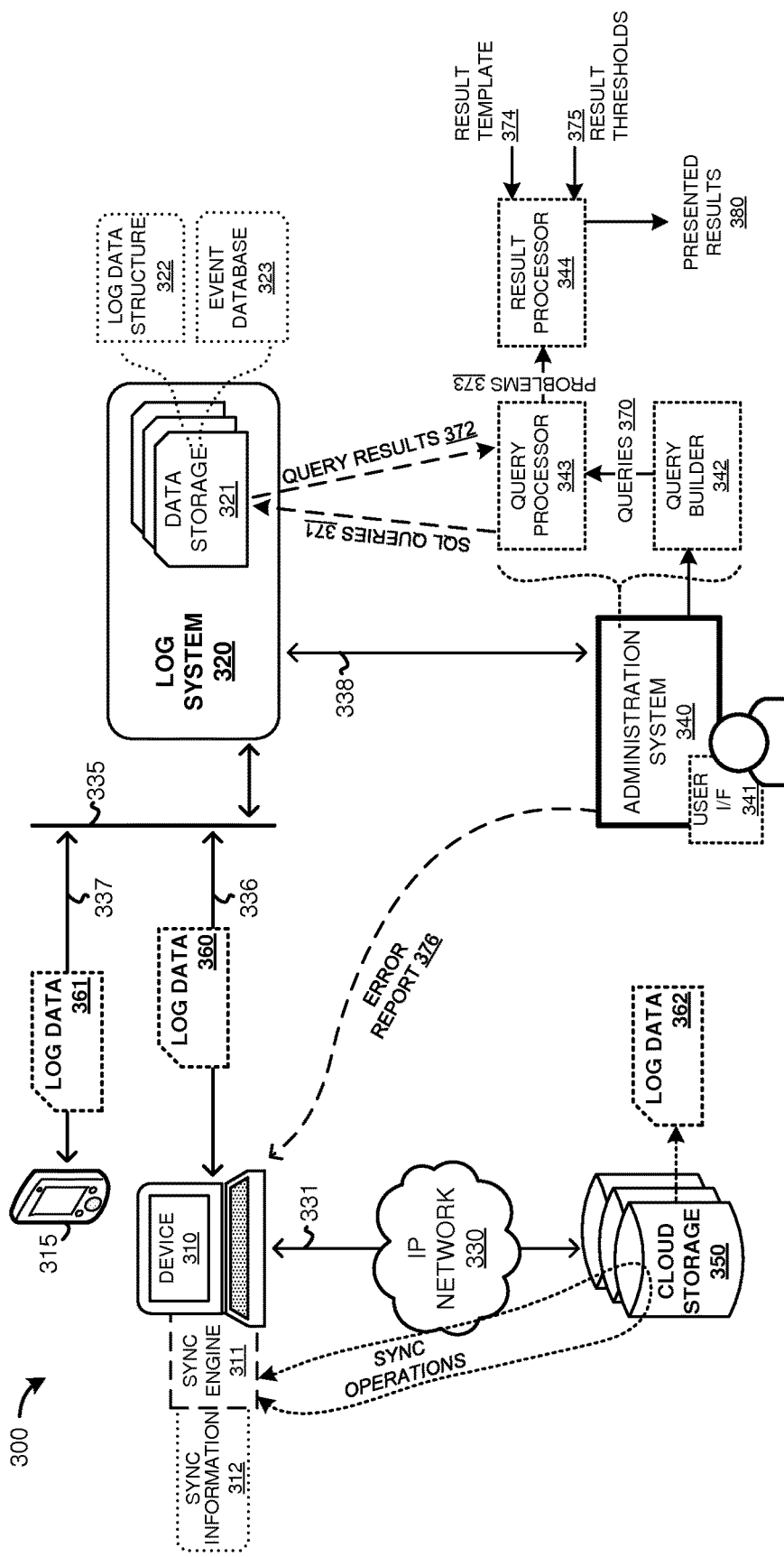
FIG. 3 is a system diagram illustrating a further data synchronization architecture in an implementation.

As a further example of a computing system employing enhanced problem detection and reporting in data synchronization operations, FIG. 3 is presented. FIG. 3 is a system diagram illustrating data synchronization architecture 300. Data synchronization architecture 300 includes device 310, device 315, log system 320, Internet Protocol (IP) network 330, administration system 340, and cloud storage 350. The elements of FIG. 3 can comprise a cloud storage platform, such as used for storage and synchronization of data across various devices, storage systems, services, and other elements, including administration, maintenance, and development systems. Example platforms for cloud storage include Microsoft OneDrive®, GoogleDrive®, Apple iCloud®, and Dropbox™, among others. However, in at least the examples below, various enhancements and improvements are discussed which provide for enhances error logging, detection, and handling by a cloud storage platform.

Each of devices 310 and 315 comprise end user devices that can receive, edit, originate, modify, or otherwise employ user data. This user data is incorporated into a cloud storage system, and is synchronized among various devices associated with a cloud storage account. For example, device 310 can comprise a laptop computer and device 315 can comprise a smartphone device. Both of devices 310 and 315 can execute and application or software for storing and synchronizing data across distributed cloud storage elements. Each of devices 310 and 315 communicate with cloud storage elements, such as cloud storage 350 over one or more IP networking connections and IP network 330. Specifically, device 310 communicates over IP link 331 over IP network 330 with cloud storage 350. Cloud storage 350 comprises one or more data storage systems, such as servers, network-attached storage devices, cloud storage devices, among other storage systems, and can be localized or distributed. Further, devices 310 and 315 can communicate with log system 320 over network links, and network 335 for reporting of log data related to operations of data synchronization threads on the devices. Device 310 can communicate over network link 336 and network 335 with log system 320, and device 315 can communicate over network link 337 and network 335 with log system 320. Network 335 can include any number of network links or networks and routing elements, and can include elements of IP network 330, such as the Internet.

In FIG. 3, device 310 includes sync engine 311. Sync engine 311 handles synchronization of user data between device 310 and cloud storage 350. Sync engine 311 can comprise an application, drivers, databases, graphical user interface elements, kernel elements, network interface elements, and data storage elements, among other elements. In some examples, sync engine is a software package dedicated to storage and synchronization of user data with cloud storage elements, such as cloud storage 350. In other examples, sync engine 311 includes hardware elements, such as storage devices, processing circuitry, application specific processing circuitry, and the like, for handling storage and synchronization of user data over a network connection. Additionally, sync engine 311 establishes and maintains sync information 312. Sync information 312 includes information related to the operation of sync engine 311 and of device 310. This information can include synchronization operation events, errors, issues, and status, as well as device events, errors, issues, and status. Operating system and driver information can also be maintained in sync information 312. In operation, sync information 312 can comprise one or more data structures that can be processed by device 310 to provide log data 360 to external devices, such as log system 320. Log data 360 can comprise portions of sync information 312, along with additional information relevant to operations of device 310.

Log system 320 comprises computer equipment, such as server equipment which can be distributed among various locations. In some examples, log system 320 comprises virtualized server or computer equipment, and can be instantiated and executed on-demand. Log system 320 receives and stores log data structure 322 from user devices in at least data storage 321. In some examples, data storage 321 comprises one or more computer readable storage media which stores log data received from user devices. Log system 320 can include elements from administration system 340 in some examples.

Administration system 340 comprises computer equipment, such as user devices, terminal equipment, user interface equipment, and the like. In some examples, administration system 340 comprises a graphical user interface provided by elements of log system 320 or by a computing device local to an operator. In this example, administration system 340 includes user interface 341, query builder 342, query processor 343, and result processor 344. It should be understood that the functions of the various elements of administration system 340 can be distributed in a different manner than pictured in FIG. 3. In some examples, elements of administration system 340 are included in log system 320. Further examples of administration system 340 are included below in FIG. 9. Administration system 340 and log system 320 communicate over network link 338, which can comprise an IP link carried over one or more IP networks. In some examples, network link 338 comprises a virtual or logical link.

Cloud storage 350 comprises one or more computer readable storage media that are distributed over a geographic area for storage of user data. Cloud storage 350 can be a part of a larger cloud storage system or cloud storage platform, such as mentioned above. More than one cloud storage element can be include and distributed geographically for redundancy, speed, and locality to users. Cloud storage 350 also comprises computer systems, such as server equipment, network interface cards, storage media, physical enclosures, and the like. In this example, cloud storage 350 communicates with user devices over IP network 330 and at least IP link 331. Synchronization operations occur between user devices and cloud storage 350 for storage, updating, and synchronization of user data among user devices. In examples where cloud storage 350 is included in a larger cloud storage system or cloud storage platform, log system 320, administration system 340, and various communication interconnect can also be included in the cloud storage system or platform to comprise a large-scale deployed cloud storage environment for users and operators or administrators. Sync engine elements, such as sync engine 311, can be deployed to user devices to handle the various user-facing features of the cloud storage environment.

Figure 4:
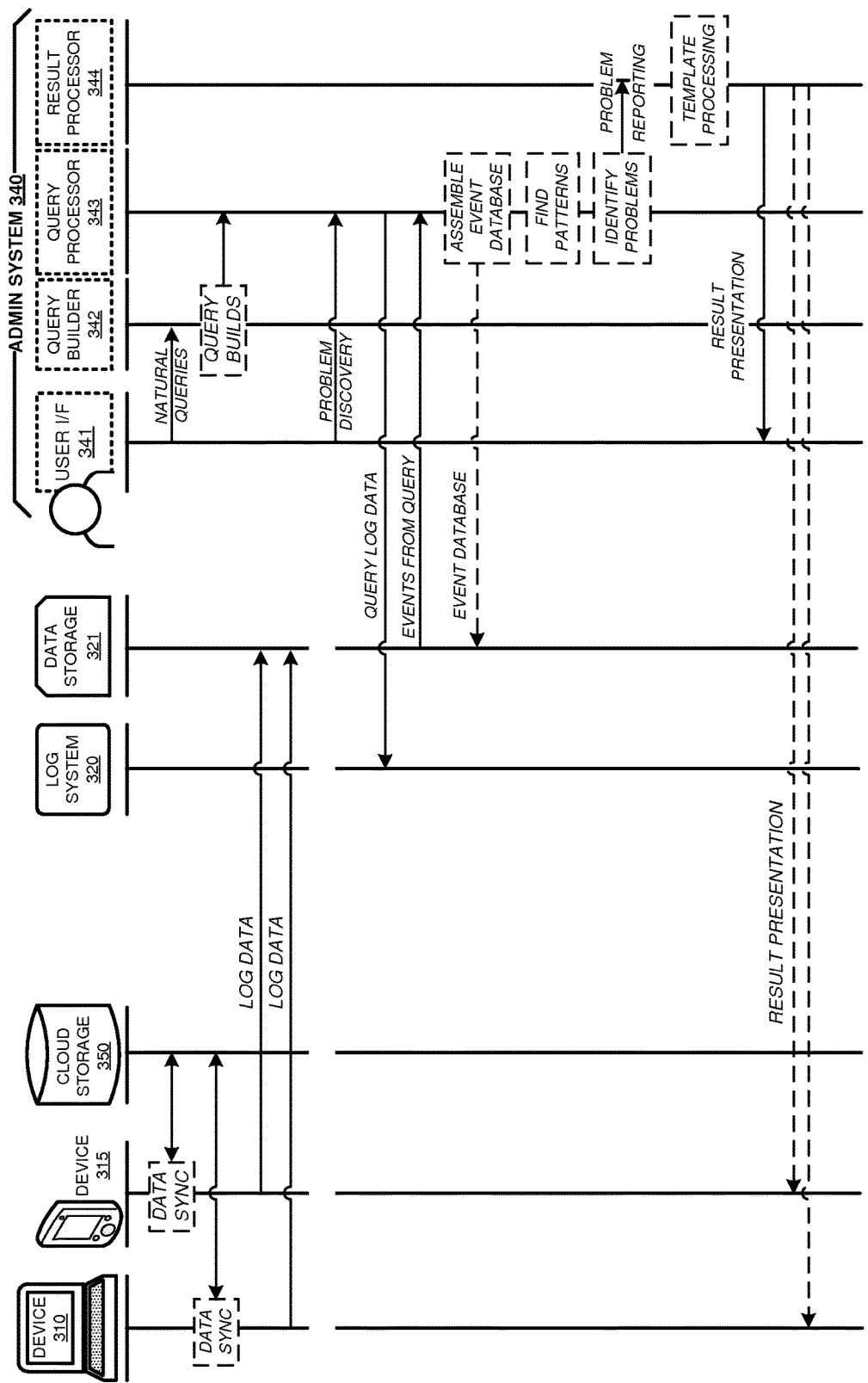
FIG. 4 is a sequence diagram illustrating a method of enhancing error detection in data synchronization operations in an implementation.
Figure 5:
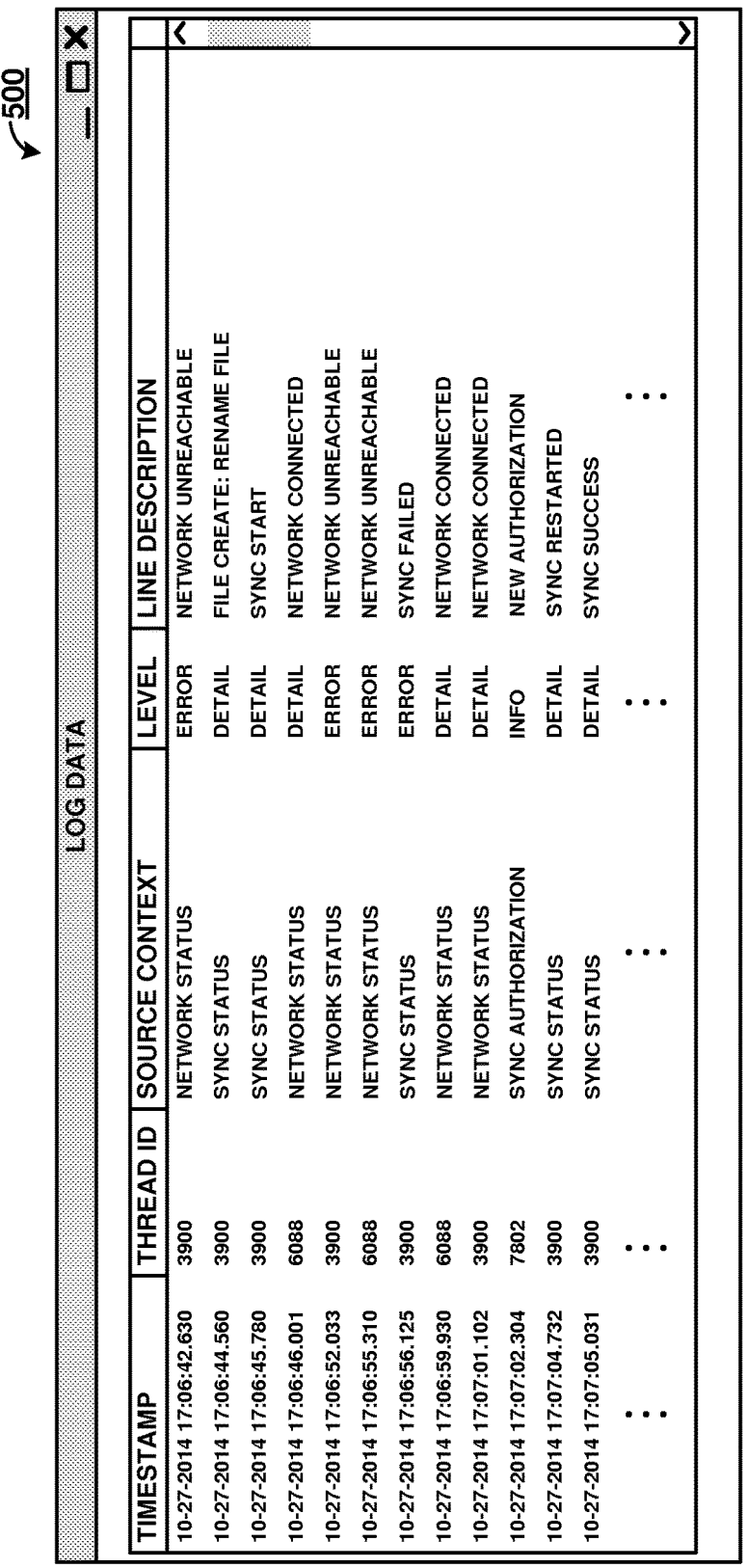
FIG. 5 is a diagram illustrating example log data.
Figure 6:
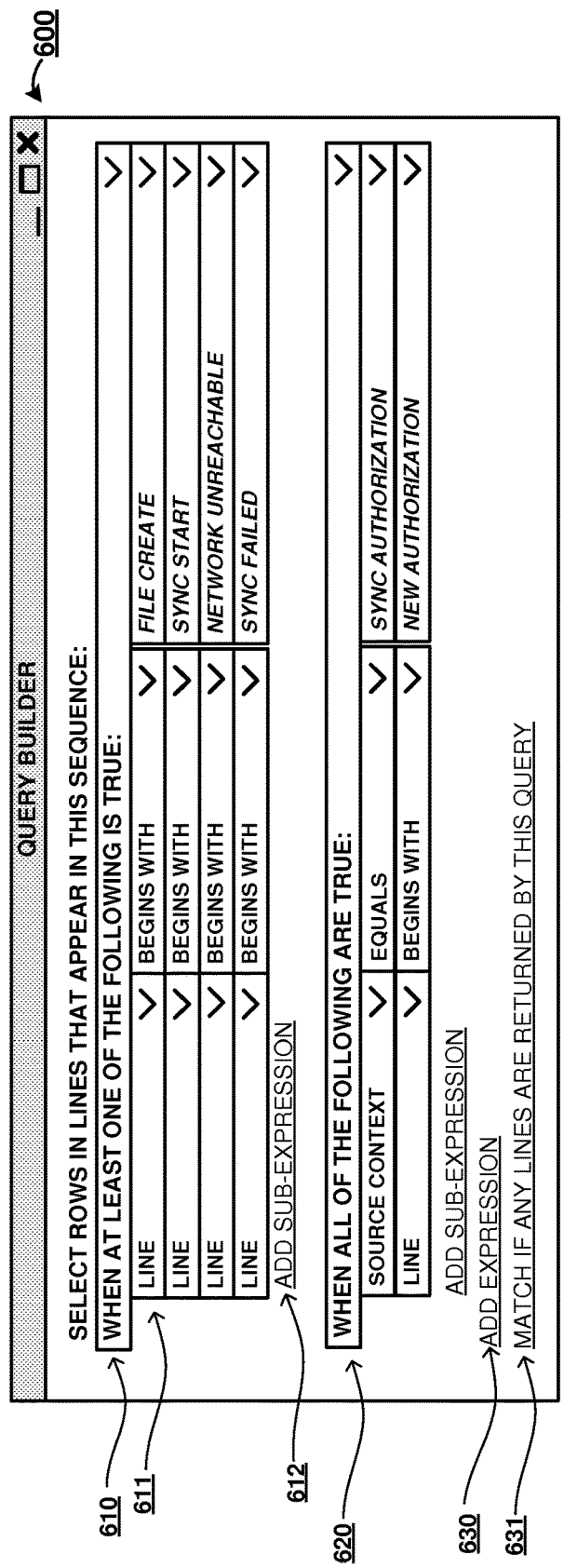
FIG. 6 is a diagram illustrating an example of a query build process.
Figure 7:
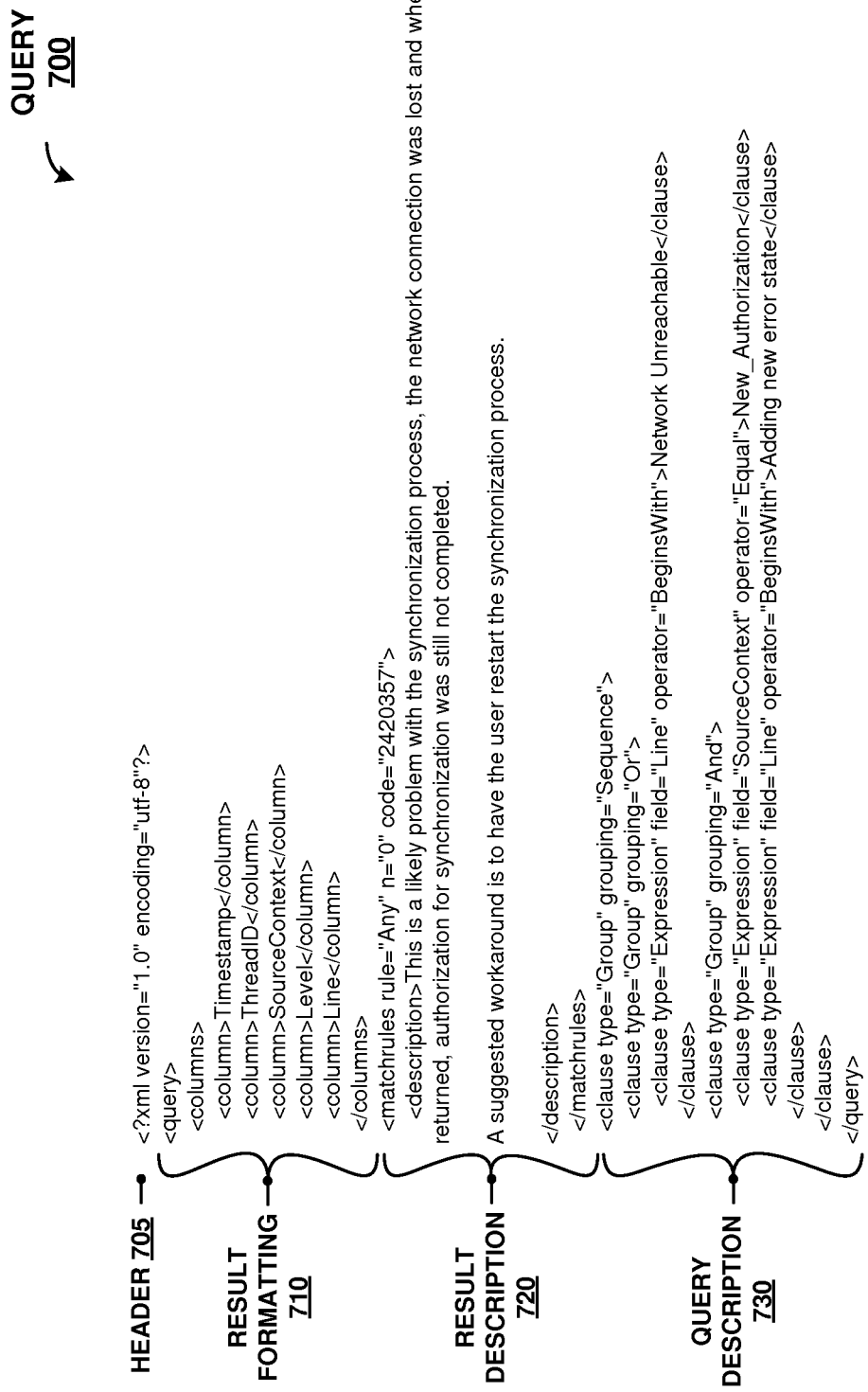
FIG. 7 is a diagram illustrating an example query.

To illustrate example operations of data synchronization architecture 300, FIGS. 4-8 are presented. FIG. 4 is a sequence diagram illustrating a method of operating data synchronization architecture 300. FIG. 5 is a diagram illustrating example log data and events, along with example user interface elements for presenting log data and problem results. FIG. 6 is a diagram illustrating example query building processes, along with associated user interface elements. FIG. 7 illustrates an example query in an extensible markup language (XML) format. FIG. 8 illustrates example pattern matching. FIG. 9 illustrates example problem discovery results.

Turning first to FIG. 4, device 310 and device 315 both can synchronize data stored on each respective device with data stored by cloud storage 350. This data synchronization can occur during usage of each device, such as during file creation, editing, modification, and other data handling operations. For example, a user can create a document in a word processor application employed on device 310, and that document can be selectively stored locally by device 310 and also mirrored into cloud storage 350. Sync engine 311 can handle the synchronization process for not only initially storing the document into cloud storage 350 as well as detecting changes to the document and synchronizing those changes with cloud storage 350. Events and operational information related to the storage and synchronization process can be stored into sync information 312. Similar operations can occur for other types of data as well as other devices that employ a similar sync engine.

Periodically, log data is transferred for storage by data storage 321 in log data structure 322. This log data can be a portion of the information stored by sync information 312. For example, device 310 can transfer log data 360 based on information included in sync information 312. Sync engine 311 can handle this transfer of log data 360. In many examples, log system 320 can receive the log data and responsively store this data in data storage 321. The log data, such as log data 360, log data 361, or log data 362, can be transferred periodically and responsive to a recurring event, such after a predetermined period of time. In other examples, the log data is transferred responsive to a problem or error in data synchronization that is detected by device 310, device 315, or cloud storage 350. Log system 320 can request log data be transferred by any of device 310, device 315, or cloud storage 350. Log system 320 can request this log data responsive to a predetermined condition, such as a period of time, or responsive to an operator instruction, including combinations thereof.

As shown in FIG. 3, cloud storage 350 can transfer log data for receipt by log system 320, such as indicated for log data 362. Similar operations as for log data 360 can be performed for log data 362. Furthermore, when log data is received into log system 320 from a first source, then corresponding log data can be requested by log system 320 from other sources. Specifically, if log data 360 is received by log system 320, then log data 362 might be requested from cloud storage 350 to corroborate events that occur in the log data. Over time, various log data is accumulated and assembled in log data structure 322 of data storage 321. The log data indicates events related to operations of user devices and cloud storage elements, such as data synchronization operations and related operations.

Responsive to errors occurring or just due to operator desires, this log data can be analyzed for problems or errors. Administration system 340 can handle log data analysis for problem identification, error detection, and resultant problem resolution and presentation to users, among other operations. In FIG. 4, administration system 340 retrieves log data from log system 320, and log system 320 can responsively transfer log data for delivery to administration system 340. In the example shown in FIG. 4, the log data is requested responsive to an operator of administration system 340 to discover any problems that have occurred in data synchronization operations of the cloud storage system.

FIG. 5 provides one example of log data retrieved from data storage 321 by administration system 340. It should be understood that other log data contents and formats can be employed. In FIG. 5, log data 500 is provided in a windowed graphical user interface. Several columns indicate various properties for the associated log data, namely timestamp, thread id, source context, level, and line description. Other columns can be employed, as determined in part by the log data and event types. For example, other columns can include identifiers, line names, file names, contextual indicators, notes, error types, process identifiers, thread identifiers, payload information, bookmarks, version information, or other columns that are associated with properties of the various events.

The timestamp column indicates a time associated with a particular event, such as when an event occurs or when an event is logged. The thread identifier (ID) column indicates a process or execution thread associated with a particular event. In the example shown in FIG. 5, a multi-process or multi-threaded architecture is employed where multiple data synchronization operations and associated operating system, network, hardware, and other operations occur in parallel. Each individual process or thread is tracked and indicated by a unique thread ID in the log data. Threads of various processes can be initiated and terminated during the course of data synchronization operations. The source context column indicates contextual information for the particular event, such as if the event is related to a specific type or operation or a function that is associated with the event. For example, FIG. 5 shows source contexts comprising network status events, sync status events, and sync authorization events. Other event types can be included, as determined by the operations of a particular sync engine or logging process. The level column indicates an alert level or severity level of a particular event, such as the error, detail, and info levels indicated in FIG. 5, among others. Finally, the line description indicates a detailed description for each particular event, and can include predetermined messages, contextual information, or event-specific data that can aid in identification and analysis of the particular event. Other columns can be included, and the ones shown in FIG. 5 are merely exemplary.

However, prior to or concurrent with retrieval of the log data from log system 320, administration system 340 can establish one or more queries to extract problems or errors from log data. In this example, user interface 341 can receive query descriptions from a user or operator, such as entered using a user or logical language entry method. A logical language entry can include an operator using a user input device to describe a query in human-centric terminology, such as in sentence formats, whether written or spoken. Other examples can include an operator using a special syntax or computer language to enter a query. However, in the examples discussed herein, such as in FIG. 6, a graphical interface is provided for an operator to enter one or more queries that can be used to identify problems in the data synchronization operations. Once the query has been entered or otherwise established by an operator using user interface 341, then query builder 342 can responsively determine a computer-language based query that is employed for an actual query of a corresponding database. The computer-language based query can include a Structured Query Language (SQL) query, among other query syntaxes that are native to a particular database or database type.

Turning now to FIG. 6, a brief description of an example query building process is shown. FIG. 6 includes query builder 600 represented in a windowed graphical user interface. Command line or textual-based query builder elements could instead be employed.

Query builder 600 includes a customizable quantity of queries which are built by a user selecting various choices in a plurality of pull-down menu elements. For example, a first query is shown that includes a top level logical expression 610 and four sub-expressions 611 that must satisfy the top level logical expression. In this example, expression 610 indicates "when at least one of the following is true" then extract events that match with the sub-expressions from log data. A second query is shown that includes a top level logical expression 620, namely "when all of the following are true," and one sub-expression. The graphical user interface allows for addition and deletion of expressions and sub-expression, such as through elements 612 and 630. Various expressions can be used in the query building process, such as "when at least one of the following are true," "when all of the following are true," "when lines appear in this sequence," "when a line is missing in which one of the following is true," and "when a line is missing in which all of the following are true," among other expressions, including variations thereof.

Once the queries are executed against log data, all lines from the log data that satisfy the various expressions and sub-expressions are extracted from the log data. These extracted lines comprise a subset of the lines in the log data included in log data structure 322 in FIG. 3, with each line corresponding to an event. This extracted subset of log data is assembled into event database 323 and further processed by administration system 340 as detailed below for query processor 343. It should be noted that the subset of log data included in event database 323 contains interleaved events from among the various threads of processes.

Furthermore, element 631 indicates a result threshold used for presenting results to a user. A default result threshold might present results if any events match the logical expressions of the query. Specifically, in FIG. 6, element 631 indicates that the queries indicated in FIG. 6 should present results if any lines indicated by the queries find a match. Other result thresholds can be included, such as matching if none of the lines are returned by a query, matching if less than, greater than, or exactly a threshold quantity of lines are matched including variations and combinations thereof.

Once one or more queries are established by a user or operator of the graphical or user-facing elements of query builder 342 in FIG. 3 (or alternatively, query builder 600 of FIG. 6), then one or more native queries 370 are generated by query builder 342. Queries 370 can be in a native query language that can be used to query a database, such as SQL, among other syntaxes or computer languages. Queries 370 are provided to query processor 343 for further handling of event log data.

To illustrate an example of a native query, such as included in queries 370, FIG. 7 is provided. FIG. 7 indicates an example query generated by query builder 342, as shown in an XML format. Query 700 of FIG. 7 includes several portions as delimited by XML markup, namely header 705, result formatting 710, result description 720, and query description 730.

Header 705 can describe the format and versioning of the XML language used in query 700, as well as identify query 700 as using the XML format. Further identification or informational information can be included in header 705. Result formatting 710 indicates a format, layout, or ordering of any results obtained using query 700, such as seen in FIG. 5. In result formatting 710, several columns are specified, namely a timestamp, thread ID, source context, level, and line description columns. These can be used to organize or format results obtained using query 700. Result description 720 can include various descriptive or plan-language details that relate to a fully processed and identified problem, as will be discussed later with regard to result processor 344 of FIG. 3. Result description 720 can be presented to a user according to a result threshold, such as result threshold 631 of FIG. 6, although other result thresholds can prompt result description 720 from being presented. Query description 730 indicates the various expressions and sub-expressions to perform a query operation. Query description 730 can be processed to identify a query in a native syntax, such as SQL. These expressions and sub-expressions can be defined using query builder 342 (or alternatively, query builder 600 of FIG. 6).

Returning to the operations of FIG. 4, once queries 370 have been established by query builder 342, query processor 343 can issue one or more SQL queries 371 to log system 320 against log data structure 322 stored in data storage 321. Log system 320 returns events responsive to queries 371, as query results 372. Query processor 343 then assembles query results 372 into an event database. This event database can be stored locally to administration system 340, or alternatively stored in event database 323 in data storage 321.

Query processor 343 processes the events in event database 323 to find patterns in the events that indicate problems or errors related to data synchronization operations that were initially stored in log data structure 322. In addition to specifying events of significance, a query can specify that a particular pattern should be found for various thread or threads in order to indicate a problem. These patterns can comprise sequential patterns of events, such as when events associated with a particular thread or process occur in a predetermined order. Patterns other than sequential occurrence can be specified that indicate problems in data synchronization operations, such as statistical patterns, probability-based patterns, gap detection, or other patterns. In gap detection examples, a particular sequence of events is identified that lack a particular event or events, such as a missing step or event indicative of a problem.

For example, as shown in FIG. 6, queries can be established that find all events indicated by the query. However, the events returned in query results are non-specific to a particular thread, and thus many events that satisfy the expressions or sub-expressions are interspersed or interleaved with each other for many different threads.

FIG. 8 includes a further example of a query and associated results, specifically for a sequential query example. Query 810 of FIG. 8 describes a query similar to the first query of FIG. 6. Event database 820 includes log data comprising events of many different event types, although for brevity in FIG. 8 only seven events are shown. Query 810 specifies four event types as well as a sequence of those event types, which are to be returned from event database 820 based on matching the "line description" property of the events.

Four event types are to be returned by query 810, and query results 830 show a list of events returned by query 810, such as from a larger collection of events in log data. Query results 830 are organized in FIG. 8 into a listing based on the "line description" property of the events. Note that some events found in event database 820 are not returned in query results 830 due to not matching query 810. Once query results 830 are returned, a pattern matching process is performed.

In FIG. 8, a sequential pattern is desired to be found. Query results step 830 may organize individual event types found in event database 820 into groupings based on event types. As seen in FIG. 8, four groups are identified and thus four lists are created in list building step 830. Due to the limited set of data in the example shown in FIG. 8, some groups only have one event. It should be understood that in larger data sets, such as encountered in real-world log data, many events would typically be included in each group during the query result and list building process.

Once the events are grouped by event type into lists, then pattern matching process 840 occurs. Pattern matching process 840 arranges events returned by query 810 chronologically using the timestamp data. Thus, a chronological list is created of query results 830. As mentioned above, in larger data sets a higher number of events will typically be included in each chronological list with events from different threads interspersed among each other. A sequence of events as indicated in query 810 is sought during pattern matching process 840. In this example, a pattern match occurs that includes sequential events specified in query 810. Problem 850 is thus identified as having satisfied the criteria specified by query 810.

To perform the pattern matching, such as in step 840 of FIG. 8, various matching techniques can be employed. In sequential queries and pattern matching, a state counter can be employed, such as seen in FIG. 1, which keeps track of a state of matching expected events via a counter. When the counter reaches a predetermined value, then the sequence can be determined to have been found. Other matching techniques can be employed in statistical or probabilistic queries, such as counting quantities of specific events within a predetermined quantity of total events.

Returning to the operations of FIG. 4, once a pattern matching process is performed by query processor 343, and any associated problems are identified, then these problems are reported to result processor 344. In FIG. 3, problems 373 are indicated to result processor 344. Result processor 344 handles result reporting, among other operations.

Result processor 344 can receive one or more result templates 374 and result thresholds 375. Result templates 374 can include predetermined descriptions, solutions, and formatting that correspond to a particular problem identified by query processor 343. For example, if the problem identified is for a network connectivity issue, then a result template can be employed to provide descriptions, solutions, and formatting for an indication of the network connectivity issue to a user or user interface. Other result templates can be employed for further problems anticipated by an operator or administrator. In addition, blank templates or multipurpose templates can be employed for new or previously unidentified problem types. The result templates can incorporate information that is specific to a particular occurrence of a problem, such as time/date information, thread identifiers, or other information.

Result thresholds 375 can include various reporting thresholds for problems found in log data. For example, a particular problem might be found, but reporting of the problem might not be desired until a predetermined quantity of problems for that particular type of problem have been identified. A threshold level of problems can be established which limit reporting of problems to a user or through a user interface until the threshold level of problems have been exceeded. Result templates 374 and result thresholds 375 can be developed by a user of administration system 340 and stored for later use during problem discovery processes.

Once the various problems are processed by result processor 344, these results are presented by result processor 344, as shown by element 380 in FIG. 3. Result processor 344 can provide a listing of the problems as well as any relevant information to describe the problems, along with any proposed solutions or status information related to the problems. These presented results 380 can be presented over a graphical user interface, such as user interface 341 of administration system 340. In further examples, presented results 380 are presented to an associated user device affected by the problems. As seen in FIG. 3, error report 376 is optionally transferred for delivery to device 310, which can indicate problems found, solutions suggested, root cause information, or other information to device 310 or a user of device 310.

As a specific example of results presentation, FIG. 9 is presented. FIG. 9 includes a windowed graphical user element 900 that indicates various problem results as well as descriptions thereof. In results portion 910, a problem code is listed along with an associated problem description. All problems found during a query and pattern matching process can be included in portion 910, organized into a columnar format. When a user clicks or selects a particular problem in portion 910, then that problem is detailed in portions on the right-hand side of graphical user element 900.

Various detail boxes are included in graphical user element 900, such as 912-915, which indicate various information about the selected problem. For example, a problem code, which can be a unique identification number or a number which is associated with a problem type is indicated in box 912. An error title is included in box 913. A problem description is indicated in box 914, which includes a detailed description of the problem, why it might have occurred, and possible proposed solutions based on previous handling of the problem. Finally, an error status box 915 indicates possible status on the problem type, such as if the problem is an open issue, has been solved in later revisions of a sync software or sync engine, or further information on the status of the error or problem. It should be understood that the examples shown in FIG. 9 are merely illustrative of results presentation and can vary. Additionally, the specific formatting and contents of graphical user element 900 can be specified in a result template, such as result templates 374 of FIG. 3.

In further examples, result templates 374 include error templates comprising one or more error messages that correspond to a particular error or problem. Once a problem or error has been identified by query processor 343, result processor 344 can process an indication of at least one error condition or problem against an error template to identify a selected error message among one or more predetermined error messages, and communicate the selected error message.

Also, although log data can be collected and analyzed responsive to operator intervention, log system 320 can continually monitor log data to detect predetermined problems or to indicate statistically likely problems from among the log data. Log system 320 can employ elements described for administration system 340 to identify problems during operation and responsively transfer indications of the problems and possible resolutions for delivery to end user devices or administrators/operators of an associated cloud system.

Although the example discussed above deals with sequential pattern matching of events, other pattern matching can be employed. For example, statistical pattern matching can be employed by query processor 343. Specifically, query processor 343 can process a listing of events to find statistically correlated occurrences of target events for individual threads or operations among the data synchronization threads. The listing of events can include entire sets of log data, such as log data 360 or assembled log data in log data structure 322. In other examples, a query is first executed on log data to determine a subset of events to perform the pattern matching upon. In either case, the statistical patterns can be useful for identifying previously unknown or new problems in data synchronization operations. A first example statistical pattern can include identifying when a quantity of error or warning events for a particular thread exceeds a threshold quantity. A second example statistical pattern can include identifying if an event is duplicated and consists of more than a threshold percentage of the set of events or log data. A third example statistical pattern can include identifying when an event is repeated sequentially more than a threshold quantity of times. A fourth example statistical pattern can include identifying when a specific event occurs more than a first threshold quantity of times within less than (or greater than) a second threshold number of total events.

Figure 10:
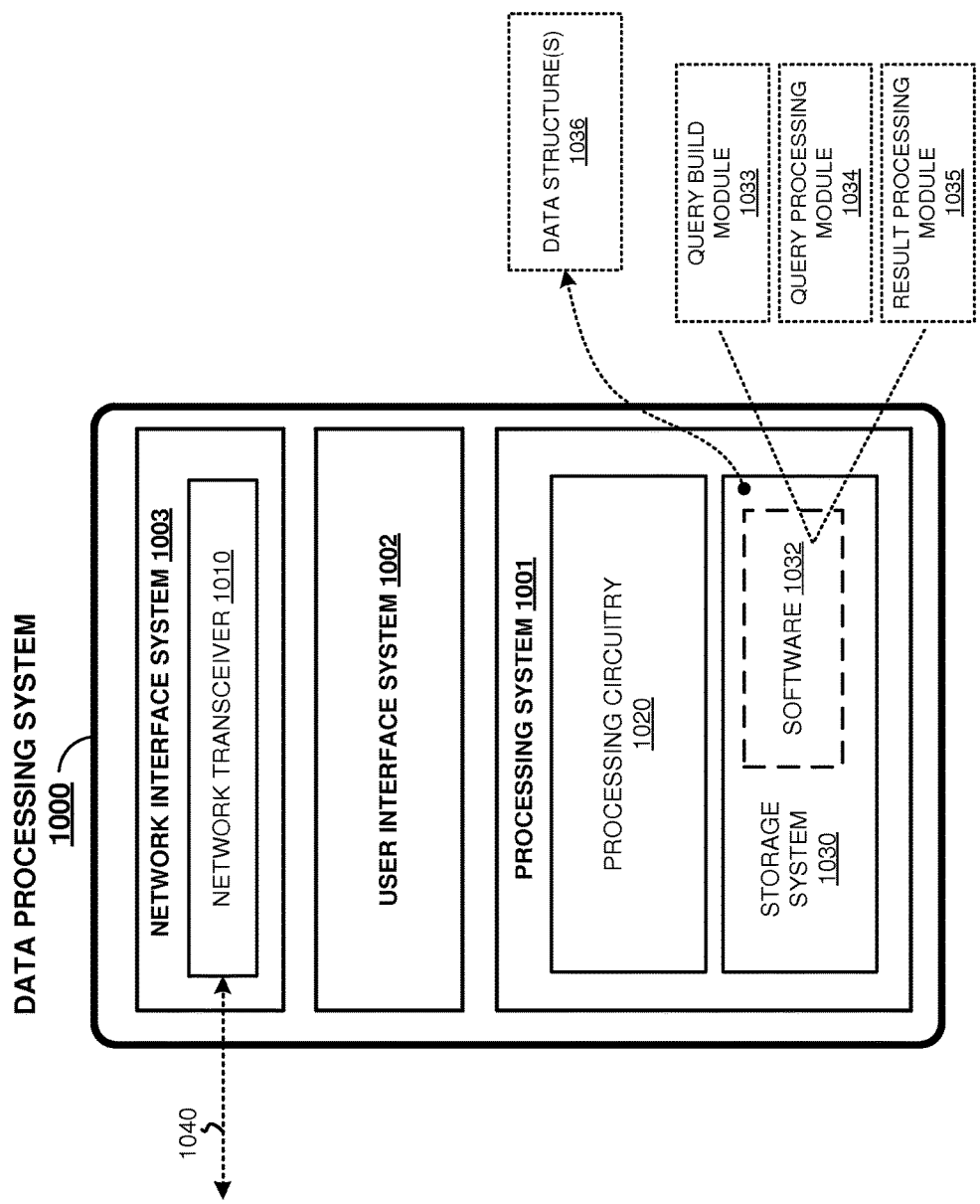
FIG. 10 is a block diagram illustrating a data processing system in an implementation.

To further illustrate examples of data processing system 120 or operator system 130 of FIG. 1, as well as administration system 340 or log system 320 of FIG. 3, FIG. 10 is presented. The elements of FIG. 10 could be used to implement a data processing system, such as data processing system 120 of FIG. 1. The elements of FIG. 10 could be used to implement a user interface system, such as operator system 130 of FIG. 1. In some examples, data processing system 120 and operator system 130 of FIG. 1 can be combined into the elements of FIG. 10.

FIG. 10 is a block diagram illustrating data processing system 1000. Data processing system 1000 includes processing system 1001, user interface system 1002, and network interface system 1003. In operation, elements of processing system 1001 are operatively linked to elements of network interface system 1003 and elements of user interface system 1002 by one or more communication interfaces, which can comprise a bus, discrete connections, network links, software interfaces, or other circuitry. Data processing system 1000 can be distributed or consolidated among equipment or circuitry that together forms the elements of data processing system 1000. Data processing system 1000 can optionally include additional devices, features, or functionality not discussed here for purposes of brevity.

Network interface system 1003 includes one or more network interfaces. In data processing system 1000, network interface system 1003 includes network transceiver 1010. Network transceiver 1010 includes at least one communication interfaces for communicating over at least one packet network link. The packet network link can include Ethernet links, IP links, T1 links, or other network communication links. Network transceiver 1010 includes transceivers, network interface card equipment, modems, and other communication circuitry. In this example, network transceiver 1010 communicates over link 1040. Link 1040 can include one or more packet network links as described herein, such as that described for data links 140-142 in FIG. 1 or links 331-338 in FIG. 3. In some examples, network interface system 1003 includes one or more wireless transceivers for communicating over wireless links.

User interface system 1002 may be any type of user interface capable of presenting information to a user. User interface system 1002 may include software interfaces such as graphical user interfaces, web interfaces, remote desktop interfaces, windowed interfaces, or other software interfaces. User interface system 1002 may include hardware interfaces such as touch screens, monitors, indicator lights, or other hardware interfaces in some examples. Input devices include any device capable of capturing user inputs and transferring them to processing system 1001. Input devices may include a network interface, keyboard, mouse, touch pad, or some other user input apparatus. Output devices can include any device capable of transferring outputs from data processing system 1000 to a user. Output devices may include network interfaces, printers, projectors, displays, or some other user output apparatus. In further examples, elements of user interface system 1002 can be included in processing system 1001 or network interface system 1003.

Processing system 1001 further includes processing circuitry 1020 and storage system 1030. Processing circuitry 1020 can comprise one or more microprocessors and other processing circuitry that retrieves and executes software 1032 from storage system 1030. Processing circuitry 1020 can be implemented within a single processing device but can also be distributed across multiple processing devices or sub-systems that cooperate in executing program instructions. Examples of processing circuitry 1020 include general purpose central processing units, application specific processors, and logic devices, as well as any other type of processing device, combinations, or variations thereof. In some examples, portions of processing circuitry 1020 is physically separate from some elements of data processing system 1000 and area included in remote servers, cloud-based processing systems, or virtualized computing systems.

Storage system 1030 can comprise any computer readable storage media capable of storing software 1032 that is executable by processing circuitry 1020. Storage system 1030 also includes data structures 1036 which include one or more databases, tables, lists, or other data structures that can include log data, event lists, pattern matching results, result templates, thresholds, queries, or other information, including combinations and variations thereof. Storage system 1030 can include volatile and nonvolatile, removable and non-removable media implemented in any method or technology for storage of information, such as computer readable instructions, data structures, program modules, or other data. In no case is the computer readable storage media a propagated signal.

In addition to computer readable storage media, in some implementations storage system 1030 may also include computer readable communication media over which software 1032 may be communicated internally or externally. Storage system 1030 can be implemented as a single storage device but can also be implemented across multiple storage devices or sub-systems co-located or distributed relative to each other. Storage system 1030 can comprise additional elements, such as a controller, capable of communicating with processing circuitry 1020. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 1032 can be implemented in program instructions and among other functions can, when executed by data processing system 1000 in general or processing circuitry 1020 in particular, direct data processing system 1000, processing system 1001, or processing circuitry 1020 to operate as discussed in the examples herein, among other operations. Software 1032 can include additional processes, programs, or components, such as operating system software, database software, or application software. Software 1032 can also comprise firmware or some other form of machine-readable processing instructions executable by elements of processing system 1001, such as processing circuitry 1020.

In at least one implementation, the program instructions can include query build module 1033, query processing module 1034, and result processing module 1035. Query build module 1033 receives user input via at least user interface system 1002 to establish one or more queries. Query build module 1033 can receive user or logical query definitions from a user and translate these query definitions into a native syntax or query language for querying a database that includes log data. Query processing module 1034 executes queries established by query build module 1033 and assembles log data into one or more databases of events related to data synchronization operations of devices. Query processing module 1034 processes the assembled databases to extract subsets of the events and identify patterns within the subsets that correspond to problems in the data synchronization operations. Once problems have been found, result processing module 1035 presents the problems in a user-viewable format by employing result templates, result thresholds, or other factors.

In general, software 1032 can, when loaded into processing circuitry 1020 and executed, transform processing circuitry 1020 overall from a general-purpose computing system into a special-purpose computing system customized to operate as discussed in the examples herein, among other operations. Encoding software 1032 on storage system 1030 can transform the physical structure of storage system 1030. The specific transformation of the physical structure can depend on various factors in different implementations of this description. Examples of such factors can include, but are not limited to, the technology used to implement the storage media of storage system 1030 and whether the computer-storage media are characterized as primary or secondary storage. For example, if the computer-storage media are implemented as semiconductor-based memory, software 1032 can transform the physical state of the semiconductor memory when the program is encoded therein. For example, software 1032 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Various improvements to data synchronization technology may be appreciated from the foregoing implementations. The ability to utilize log data with interspersed or interleaved events and efficiently identify problems from among the events improves existing data synchronization technology, such as data sharing, data management software, and cloud computing platforms. This enhanced manner allows for increased speed and effectiveness in identifying synchronization problems and presenting indications of these problems to users or administrators, among other operations. Such technical effects improve the functioning of these applications and enhance operations and technical support handling of various problems encountered in data synchronization platforms.

Certain inventive aspects may be appreciated from the foregoing disclosure, of which the following are various examples.

Example 1

A method of enhancing error detection in data synchronization operations, the method comprising, in a data processing system, receiving log data reported by a device and incorporating at least a portion of the log data into an event database indicating operations related to data synchronization threads on the device; in the data processing system, querying the event database to extract a listing of events in the event database, the listing of events comprising a subset of interleaved events potentially associated with at least one error condition in the data synchronization threads; in the data processing system, processing the listing of events to identify one or more patterns among the interleaved events that indicate the at least one error condition in the data synchronization threads; and in the data processing system, responsive to identifying the one or more patterns, communicating an indication of the at least one error condition in the data synchronization threads.

Example 2

The method of Example 1, wherein querying the event database to extract the listing of events in the event database comprises establishing at least a query comprising target events corresponding to the at least one error condition and identifying ones of the interleaved events that correspond to each of the target events, the listing of events comprising an interleaved subset of the interleaved events identified by the target events of the query.

Example 3

The method of Examples 1-2, wherein processing the listing of events to identify the one or more patterns among the interleaved events that indicate the at least one error condition in the data synchronization threads comprises processing the listing of events to find sequential occurrences of the target events for individual threads among the data synchronization threads.

Example 4

The method of Examples 1-3, wherein processing the listing of events to identify the one or more patterns among the interleaved events that indicate the at least one error condition in the data synchronization threads comprises processing the listing of events to find statistically correlated occurrences of the target events among the interleaved events.

Example 5

The method of Example 1-4, further comprising, in the data processing system, communicating the indication of the at least one error condition to an error reporting system; ad in the error reporting system, processing the indication of the at least one error condition against an error template to identify a selected error message among one or more predetermined error messages, and communicating the selected error message to the device.

Example 6

The method of Examples 1-5, further comprising, in the error reporting system, identifying at least a faulty operation from among the data synchronization threads as corresponding to the at least one error condition, and reporting the selected error message as associated with the faulty operation.

Example 7

The method of Examples 1-6, further comprising, in the data processing system, receiving the log data from the device and responsively incorporating portions of the log data into the event database.

Example 8

The method of Examples 1-7, wherein the operations related to data synchronization threads on the device comprise threads of a data synchronization application that are executed in parallel on the device, and wherein the log data comprises interspersed events related to the threads that are executed in parallel.

Example 9

An apparatus comprising one or more computer readable storage media; and program instructions stored on the one or more computer readable storage media for at least enhancing error detection in data synchronization operations, that when executed by a processing system, direct the processing system to at least receive log data reported by a device and incorporate at least a portion of the log data into an event database indicating operations related to data synchronization threads on the device; query the event database to extract a listing of events in the event database, the listing of events comprising a subset of interleaved events potentially associated with at least one error condition in the data synchronization threads; process the listing of events to identify one or more patterns among the interleaved events that indicate the at least one error condition in the data synchronization threads; and responsive to identifying the one or more patterns, communicate an indication of the at least one error condition in the data synchronization threads.

Example 10

The apparatus of Example 9, wherein to query the event database to extract the listing of events in the event database, the program instructions direct the processing system to establish at least a query comprising target events corresponding to the at least one error condition and identify ones of the interleaved events that correspond to each of the target events, the listing of events comprising an interleaved subset of the interleaved events identified by the target events of the query.

Example 11

The apparatus of Examples 9-10, wherein to process the listing of events to identify the one or more patterns among the interleaved events that indicate the at least one error condition in the data synchronization threads, the program instructions direct the processing system to process the listing of events to find sequential occurrences of the target events among the interleaved events.

Example 12

The apparatus of Examples 9-11, wherein to process the listing of events to identify the one or more patterns among the interleaved events that indicate the at least one error condition in the data synchronization threads, the program instructions direct the processing system to process the listing of events to find statistically correlated occurrences of the target events for individual threads among the data synchronization threads.

Example 13

The apparatus of Examples 9-12, wherein the processing instructions further direct the processing system to communicate the indication of the at least one error condition to an error reporting system; and process the indication of the at least one error condition against an error template to identify a selected error message among one or more predetermined error messages, and communicate the selected error message to the device.

Example 14

The apparatus of Examples 9-13, wherein the processing instructions further direct the processing system to identify at least a faulty operation from among the data synchronization threads as corresponding to the at least one error condition, and report the selected error message as associated with the faulty operation.

Example 15

The apparatus of Examples 9-14, wherein the processing instructions further direct the processing system to periodically request the log data from the device and responsively incorporate portions of the log data into the event database.

Example 16

The apparatus of Examples 9-15, wherein the operations related to data synchronization threads on the device comprise threads of a data synchronization application that are executed in parallel on the device, and wherein the log data comprises interspersed events related to the threads that are executed in parallel.

Example 18

A computer system to enhance error detection in data synchronization operations between a user device and a cloud storage system, the computer system comprising a network transceiver configured to receive log data comprising a series of events related to the data synchronization operations on the user device; a graphical user interface configured to present a visual representation of at least a portion of the log data to an operator of the computer system; a log processing system configured to receive a query instruction and responsively search the log data for a subset of events interspersed throughout the series of events that, when viewed together, fit a sequential pattern indicative of at least a problem in the data synchronization operations; and the graphical user interface configured to present a visual representation of an indication of at least the problem.

Example 19

The computer system of Example 18, comprising the log processing system configured to process the sequential pattern indicative of at least the problem against an error template to identify a selected error message among one or more predetermined error messages; and the graphical user interface configured to present a visual representation of an indication of at least the problem.

Example 20

The computer system of Examples 18-19, comprising the log processing system configured to process a user or logical language query received over the graphical user interface to identify the query instruction comprising one or more events that correspond to the subset of events.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of enhancing error detection in data storage synchronization operations, the method comprising:
   in a data processing system, receiving a user query defining at least one error condition to be detected among the data storage synchronization operations, the at least one error condition indicated by at least one logical expression having one or more logical sub-expressions;
   in the data processing system, receiving a log data set reported by a device for a plurality of data synchronization threads executed in parallel on the device, the log data set indicating events interspersed among the plurality of data synchronization threads represented within the log data set;
   in the data processing system, querying the log data set responsive to the user query to extract a listing of target events associated with any of the plurality of data synchronization threads that correspond to any of the at least one logical expression and the one or more logical sub-expressions;
   in the data processing system, processing the listing of the target events by at least:
      walking through each of the target events;
      incrementing a state counter responsive to individual events satisfying a sequential order indicated by the at least one logical expression and the one or more logical sub-expressions; and
      resetting the state counter responsive to individual events not satisfying the sequential order; and
   in the data processing system, responsive to the state counter reaching a predetermined value, determining that the at least one error condition has occurred in the listing of the target events, and communicating an indication of the at least one error condition.

2. The method of claim 1, wherein querying the log data set to extract the listing of the target events comprises establishing at least a query comprising target event types as one or more target event parameters and identifying ones of the events interspersed among the plurality of data synchronization threads that correspond to each of the target event types, and wherein the listing of the target events comprises a portion of the events identified by the target event types of the query.

3. The method of claim 2, wherein processing the listing of the target events comprises processing the listing of the target events to find sequential occurrences that match the one or more patterns among individual data synchronization threads interspersed among events of the plurality of data synchronization threads.

4. The method of claim 2, wherein processing the listing of the target events comprises processing the listing of target events to find statistically correlated event occurrences among the individual data synchronization threads interspersed among events of the plurality of data synchronization threads.

5. The method of claim 1, further comprising:
   in the data processing system, communicating the indication of the at least one error condition to an error reporting system;
   in the error reporting system, processing the indication of the at least one error condition against an error template to identify a selected error message among one or more predetermined error messages, and communicating the selected error message to the device.

6. The method of claim 5, further comprising:
   in the error reporting system, identifying at least a faulty operation from among the data synchronization threads as corresponding to the at least one error condition, and reporting the selected error message as associated with the faulty operation.

7. The method of claim 1, wherein the log data set includes log data from among the device and at least one other device or service associated with the data storage synchronization operations.

8. The method of claim 1, wherein the plurality of data synchronization threads comprise threads of a data storage synchronization application, wherein each of the threads correspond to data storage synchronization operations for individual data files of a cloud file storage system, and wherein the events comprise interspersed events related to the threads that are executed in parallel.

9. An apparatus comprising:
   one or more computer readable storage media; and
   program instructions stored on the one or more computer readable storage media for at least enhancing error detection in data storage synchronization operations, that when executed by a processing system, direct the processing system to at least:
   receive a user query defining at least one error condition to be detected among the data storage synchronization operations, the at least one error condition indicated by at least one logical expression having one or more logical sub-expressions;
   receive a log data set reported by a device for a plurality of data synchronization threads executed in parallel by the device, the log data set indicating events interspersed among the plurality of data synchronization threads represented within the log data set;
   query the log data set responsive to the user query to extract a listing of target events associated with any of the plurality of data synchronization threads in the event database that correspond to any of the at least one logical expression and the one or more logical sub-expressions;
   process the listing of the target events by at least:
      walking through each of the target events;

incrementing a state counter responsive to individual events satisfying a sequential order indicated by the at least one logical expression and the one or more logical sub-expressions; and resetting the state counter responsive to individual events not satisfying the sequential order; and responsive to the state counter reaching a predetermined value, determine that the at least one error condition has occurred in the listing of the target events, and communicate an indication of the at least one error condition.

10. The apparatus of claim 9, wherein to query the log data set to extract the listing of the target events, the program instructions direct the processing system to establish at least a query comprising target event types as one or more target event parameters and identify ones of the events interspersed among the plurality of data synchronization threads that correspond to each of the target event types, and wherein the listing of the target events comprises a portion of the events identified by the target event types of the query.

11. The apparatus of claim 10, wherein to process the listing of the target events, the program instructions further direct the processing system to process the listing of the target events to find sequential occurrences of the target events.

12. The apparatus of claim 10, wherein to process the listing of the target events, the program instructions further direct the processing system to process the listing of the target events to find statistically correlated event occurrences among the target events.

13. The apparatus of claim 9, wherein the processing instructions further direct the processing system to:

communicate the indication of the at least one error condition to an error reporting system;

process the indication of the at least one error condition against an error template to identify a selected error message among one or more predetermined error messages, and communicate the selected error message to the device.

14. The apparatus of claim 13, wherein the processing instructions further direct the processing system to:

identify at least a faulty operation from among the data synchronization threads as corresponding to the at least one error condition, and report the selected error message as associated with the faulty operation.

15. The apparatus of claim 9, wherein the processing instructions further direct the processing system to:

periodically request the log data set from the device and responsively incorporate further log data from among at least one other device or service associated with the data storage synchronization operations.

16. The apparatus of claim 9, wherein the plurality of data synchronization threads comprise operations of a data storage synchronization application, wherein each of the threads correspond to data storage synchronization operations for individual data files of a cloud file storage system, and wherein the events comprise interspersed events related to the operations that are executed in parallel.

17. The apparatus of claim 9, further comprising the processing system that reads and executes the program instructions.

18. A computer system to enhance error detection in data storage synchronization operations that occur between a user device and a cloud storage system, the computer system comprising:

a network transceiver configured to receive one or more log data sets each comprising events related to the data storage synchronization operations that occur between the user device and the cloud storage system, wherein the log data sets each include interspersed events related to data synchronization threads executed in parallel by an associated one of the user device and the cloud storage system;

a graphical user interface configured to present a visual representation of at least a portion of the log data sets to an operator of the computer system;

the log processing system configured to:

receive user input via the graphical user interface defining at least a query instruction indicating at least one logical expression having one or more logical sub-expressions, and responsively search the event log for a subset of events corresponding to any of the at least one logical expression and the one or more logical sub-expressions;

during a walk through each of the subset of events, incrementing a state counter responsive to individual events satisfying a sequential order indicated by the at least one logical expression and the one or more logical sub-expressions, and resetting the state counter responsive to individual events not satisfying the sequential order; and responsive to the state counter reaching a predetermined value, determining that at least one error condition has occurred in the listing of the target events; and the graphical user interface configured to present a visual representation of an indication of the at least one error condition.

19. The computer system of claim 18, comprising:

the log processing system configured to process the sequential pattern indicative of the at least one error condition against an error template to identify a selected error message among one or more predetermined error messages; and the graphical user interface configured to present a visual representation of an indication of the at least one error condition.

20. The computer system of claim 18, comprising:

the log processing system configured to process a logical language query received over the graphical user interface to identify the query instruction.

* * * * *